| United States Patent [19] | [11] Patent Number: 4,979,166 |
| --- | --- |
| Yamada | [45] Date of Patent: Dec. 18, 1990 |

[54] MULTIPLEXING APPARATUS

[75] Inventor: Yoshiko Yamada, c/o Mitsubishi Denki Kabushiki Kaisha, Communications Equipment Works, 1-1, Tsukaguchi Honmachi 8 chome, Amagasaki-shi, Hyogo, Japan

[73] Assignee: Yoshiko Yamada, Hyogo, Japan

[21] Appl. No.: 385,147

[22] Filed: Jul. 26, 1989

[30] Foreign Application Priority Data

Aug. 5, 1988 [JP] Japan ................................ 63-195703

[51] Int. Cl.$^5$ .............................................. H04J 3/22
[52] U.S. Cl. ..................................................... 370/84
[58] Field of Search .................... 370/67, 84, 66, 85.9, 370/85.11, 79

[56] References Cited

U.S. PATENT DOCUMENTS 4,375,681 3/1983 Abbott et al. ........................... 370/84
4,685,101 8/1987 Segal et al. ............................ 370/84
4,815,074 3/1989 Jacobsen ................................ 370/84

FOREIGN PATENT DOCUMENTS

61-163742 7/1986 Japan .

Primary Examiner—Douglas W. Olms
Assistant Examiner—Wellington Chin

[57] ABSTRACT

A multiplexing apparatus is disclosed in which plural digital data are written into a memory and, stored in it. The data is read out in sequence by a clock to get a subsequent group of digital data. The memory is for storing digital data to be transferred from a certain high-speed circuit to another high-speed circuit and a control device exists for performing a writing and reading-out control of the digital data for the memory. The digital data, to be relayed from a prescribed high-speed circuit of plural high-speed circuits to another high-speed circuit is initially stored. A writing of the digital data of another high-speed circuit card is allowed from the memory means by the control device when this desired high-speed circuit card is being used. Further, when another high-speed circuit card is being used, a writing of the digital data of the prescribed high-speed circuit card is allowed, from the memory device through the control device to perform a high-speed relay of the digital data of plural high-speed circuits. This results in that even if the number of high-speed circuits are increased, the number of ICs are not changed and a relay of the high-speed digital data can be performed.

17 Claims, 10 Drawing Sheets

MULTIPLEXING APPARATUS

BACKGROUND OF THE INVENTION

1. Field of the Invention

The present invention relates to a multiplexing apparatus for multiplexing plural input data (digital signals) of 400 BPS to 9600 BPS, for example, and plural data of 1.544 MBPS to plural data of 1.544 MBPS.

2. Description of the Prior Art

Figure 1:
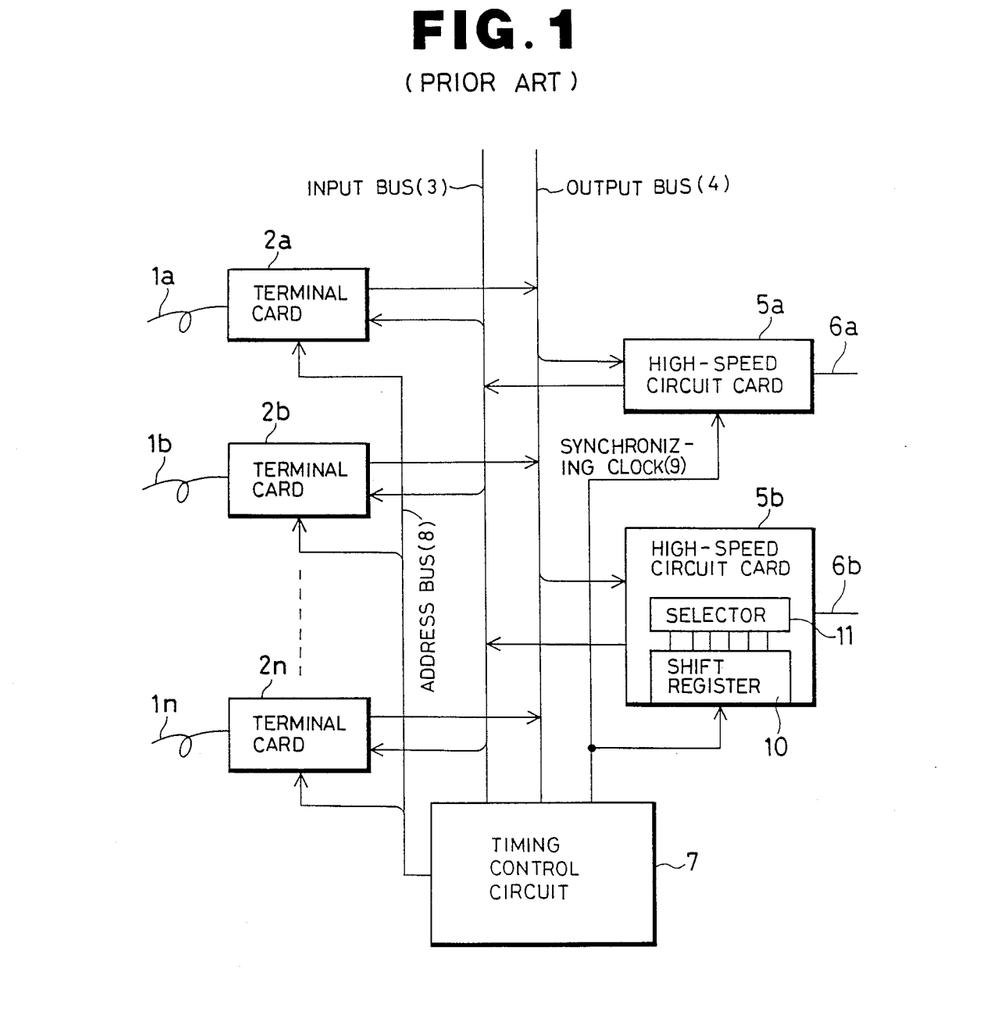
FIG. 1 is a block diagram for showing a configuration of a multiplexing apparatus of the prior art.

FIG. 1 is a schematic diagram for showing a configuration of an internal arrangement of the conventional type of multiplexing apparatus disclosed in Japanese patent Laid-Open No 61-163741 submitted with the Japanese Patent Office. Reference numerals wherein 1a-1n denote low-speed circuits, and each of these circuits is connected to each of terminal cards 2a to 2n. Reference numeral 3 designates an input bus and reference numeral 4 denotes an output bus. These are connected in common to the terminal cards 2a to 2n.

Reference numeral 5a denotes a high-speed circuit card; reference numeral 5b denotes a second high-speed card; and reference numeral 7 designates a timing control circuit and each of them is connected to the input bus 3 and the output bus 4, respectively Reference numeral 6a denotes a first high-speed circuit and reference numeral 6b designates a second high-speed circuit. Each of the high-speed circuits is connected to the high-speed circuit card 5a and the second high-speed circuit card 5b.

To the timing control circuit 7 is connected an address bus 8. The timing control circuit 7 also outputs a synchronous clock signal 9. The address bus 8 is connected to the terminal cards 2a to 2n and the synchronous clock 9 is connected to the first high-speed circuit card 5a and the second high-speed circuit card 5b. Within the second high-speed circuit card 5b are a shift register 10 and a selector 11: and to the shift register 10 receives the synchronous clock 9 and is connected to the selector 11.

Figure 3:
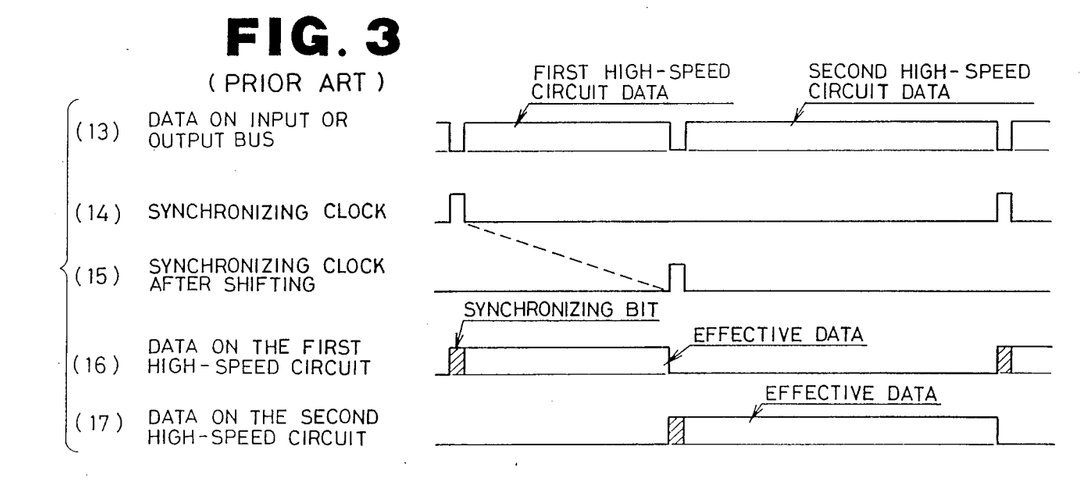
FIG. 3 is an explanatory view for showing operation of the multiplexing apparatus of FIG. 1.

In FIG. 3, reference numeral 13 denotes data on either an input bus or output bus. Reference numeral 14 denotes a synchronous clock signal 9. Reference numeral 15 denotes the synchronous clock signal 9 after shifting; Reference numeral 16 designates data on the first high-speed circuit. Reference numeral 17 denotes data on the second high-speed circuit.

Figure 2:
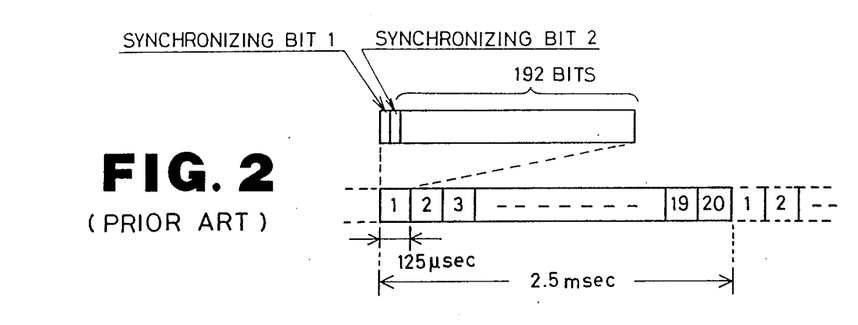
FIG. 2 is an explanatory view for showing a configuration of frame for explanating the multiplexing apparatus of FIG. 1.

Next, the operation of this device will be described. FIG. 2 illustrates a standard configuration of a PCM (Pulse Code Modulation) signal. A configuration of bits consists of a synchronous bit of one bit and data bits of 192 bits and one frame is constructed by these bits In this embodiment, one bit of 192 bits is used to cause the synchronous bit to have a value of 2. If a symbol showing one cycle in 20 frames is applied to the synchronous bit, a period for every 20 frames can be detected. Since one frame is of 125 μsec, one multi-frame occupies 2.5 msec. Accordingly, since one bit on one multi-frame is one bit per 2.5 msec, information using 400 BPS can be transferred. Thus, if n bits in one multi-frame are assigned for a transmittance of 400*nBPS, data ranging from a low-speed to a high-speed can be directly multiplexed. One multi-frame contains data of 193*20=3860 bits.

Then, in FIG. 1, the timing control circuit 7 has a counter cyclically operating at a period of 3860 and transmits a synchronous clock signal 9 once per 3860 times. The timing control circuit 7 has memories corresponding to the addresses of the terminal cards 2a to 2n for every counter values of 3860 pieces. The addresses outputted from the memories are transmitted to each of the terminal cards 2a to 2n through the address bus 8. The address values are compared with an address value of each of the cards by an address decoder in the terminal cards 2a to 2n. Subsequently, the terminal cards 2a to 2n can then use the input bus 3 and the output bus 4 only when a specified terminal card is selected The first and second high-speed circuit cards 5a and 5b may detect at first a synchronizing bit from the bits inputted from the first and second high-speed circuits 6a and 6b and fetch the input data. The first high-speed circuit card 5a may transmit the input data to the input bus 3 in compliance with a synchronizing clock signal sent from the timing control circuit 7. Since all the data sent from the first high-speed circuit 6a are determined in advance for their bits to be assigned to what terminal, a length of data representing their sum is already known. Thus the value of the selector 11 in the second high-speed circuit card 5b is set to be delayed by an amount corresponding to this data length. Since the second high-speed circuit card 5b may transmit the input data to the input bus 3 in synchronous with the shifted synchronous clock signal 15, the data from the first high-speed circuit 6a is not overlapped with the data from the second high-speed circuit 6b on the input bus 3 as indicated in the data on the input or output bus 13.

As shown in data 16 in the first high-speed circuit, the output is made such that the first high-speed circuit card 5a may provide a synchronous bit in compliance with the synchronous clock 14 to transmit the data on the output bus 4 to the high-speed circuit 6a. As shown by the data on the second high-speed circuit 17, the second high-speed circuit card 5b may provide a synchronous bit in compliance with the shifted synchronous clock 15 and transmit the data of the output bus 4 to the high-speed circuit 6b.

Since the conventional type of multiplexing apparatus is constructed as described above, it had a problem that data could not be transmitted from one high-speed circuit to the other high-speed circuit through a multiplexing device.

SUMMARY OF THE INVENTION

It is a major object of the present invention to provide a multiplexing apparatus having a relay function so as to enable transmission of data from one high-speed circuit to the other high-speed circuit through a multiplexing device to be performed.

It is another object of the present invention to provide a multiplexing apparatus which has higher performance which is superior to that of the existing device and of which realization can be performed at a relative inexpensive cost.

It is still another object of the present invention to provide a multiplexing apparatus in which a structure of this apparatus is not complex and even if the number of circuits is increased, a relay of high-speed data can be carried out without changing the number of IC.

The above and other objects and features of the present invention will become more apparent by reading the following detailed description in compliance with the accompanying drawings. Further, it is provided that the drawings are only illustrative and they do not restrict a scope of the present invention.

In order to accomplish the above objects, the multiplexing apparatus of the present invention is provided with a memory device for storing data to be transmitted from a certain high-speed circuit to another high-speed circuit and a control device for controlling a writing and a reading of data to the memory device.

That is, the memory device in the present invention may store the data to be transmitted from a certain high-speed circuit to another high-speed circuit in advance. The controlling device allows the memory device to write the data of another high-speed circuit card while a prescribed high-speed circuit card is being used. Further, the control device enables the memory device to write the data in the prescribed high-speed circuit card while another high-speed circuit card is being used, and then a relaying of high-speed data of plural high-speed circuit data is carried out.

DETAILED DESCRIPTION OF THE PREFERRED EMBODIMENTS

Referring now to the accompanying drawings, the preferred embodiments of the present invention will be described in detail.

Figure 4:
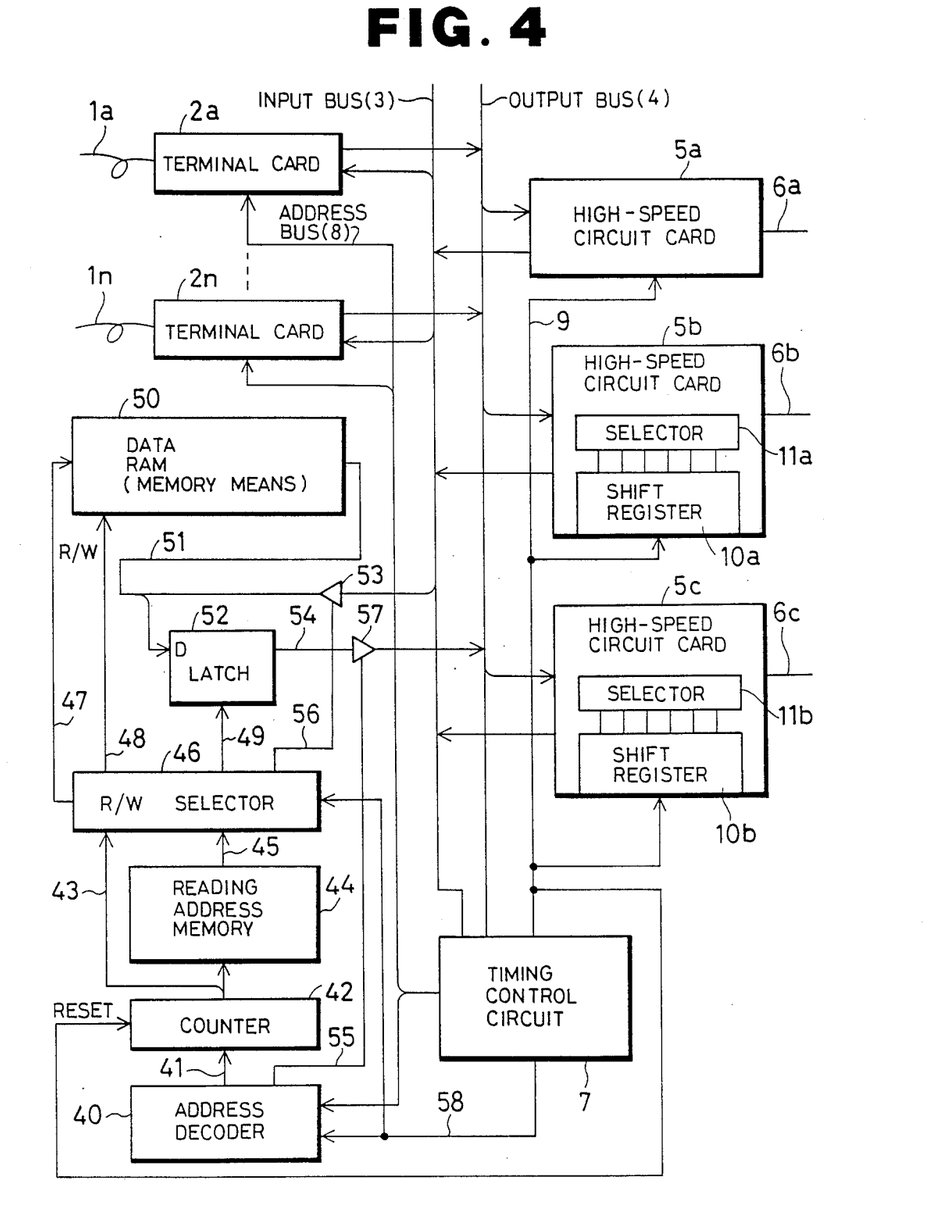
FIG. 4 is a block diagram for showing a configuration of a multiplexing apparatus of a first preferred embodiment of the present invention.

In FIG. 4, the same parts as that of FIG. 1 are affixed only with the same reference numerals. That is, 1a to 1n, 2a to 2n, 3, 4, 5a to 5c, 6a to 6c and 7 to 9 are similar to that of FIG. 1.

Reference numeral 40 denotes an address decoder to which an address bus 8 from the timing control circuit 7 is connected. Further, a cyclic clock 58 is inputted Reference numeral 42 denotes a counter in which a clock 41 for a counter from the address decoder 40, and a synchronizing clock 9, are applied as an input signal. To the counter 42 is connected a data RAM writing address bus 43. The data RAM writing address bus 43 is connected to the reading address memory 44 and R/W (reading/writing) selector 46.

The reading address memory 44 is connected to the data RAM reading address bus 45, and the data RAM reading address bus 45 is connected to the R/W selector 46. To the R/W selector 46 is also inputted the cyclic clock 58.

Reference numeral 50 designates a data RAM acting as memory device. To the address of the data RAM 50 is connected the data RAM address bus 47 from the R/W selector 46. To the R/W control terminal of the data RAM 50 is inputted the R/W control signal 48 from the R/W selector 46.

Reference numeral 53 denotes an input bus gate. Its input terminal is connected to an input bus 3 and its output terminal is connected to data RAM 50 through the data RAM data bus 51.

The data bus 51 for the data RAM is also connected to a latch 52. Reference numeral 49 denotes a latch clock from R/W selector 46 which is inputted to the clock terminal of the latch 52 Reference numeral 54 denotes a latch output bus connected to the latch 52.

This latch output bus 54 is connected to an input terminal of the output bus 57. Also, an output terminal of the output bus gate 57 is connected to an output bus 4.

To a control terminal of the gate 53 for input bus is connected a gate allowable signal 56 for input bus from the R/W selector 46. To the control terminal of the gate 57 for output bus is inputted a gate allowable signal 55 for an output bus from the address decoder 40.

Figure 5:
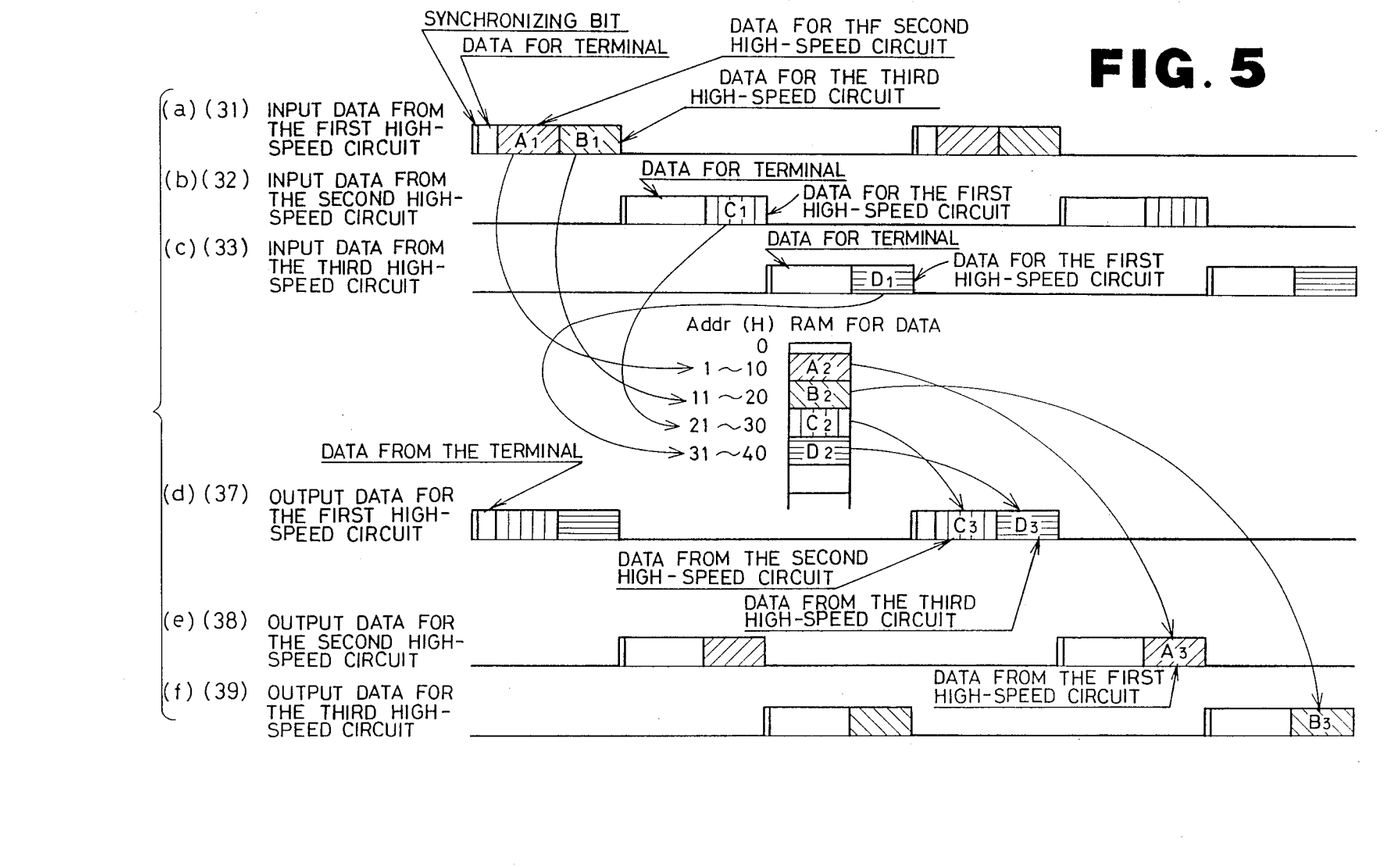
FIGS. 5 and 6 are an illustrative view for illustrating operation of the first preferred embodiment, respectively.
Figure 6:
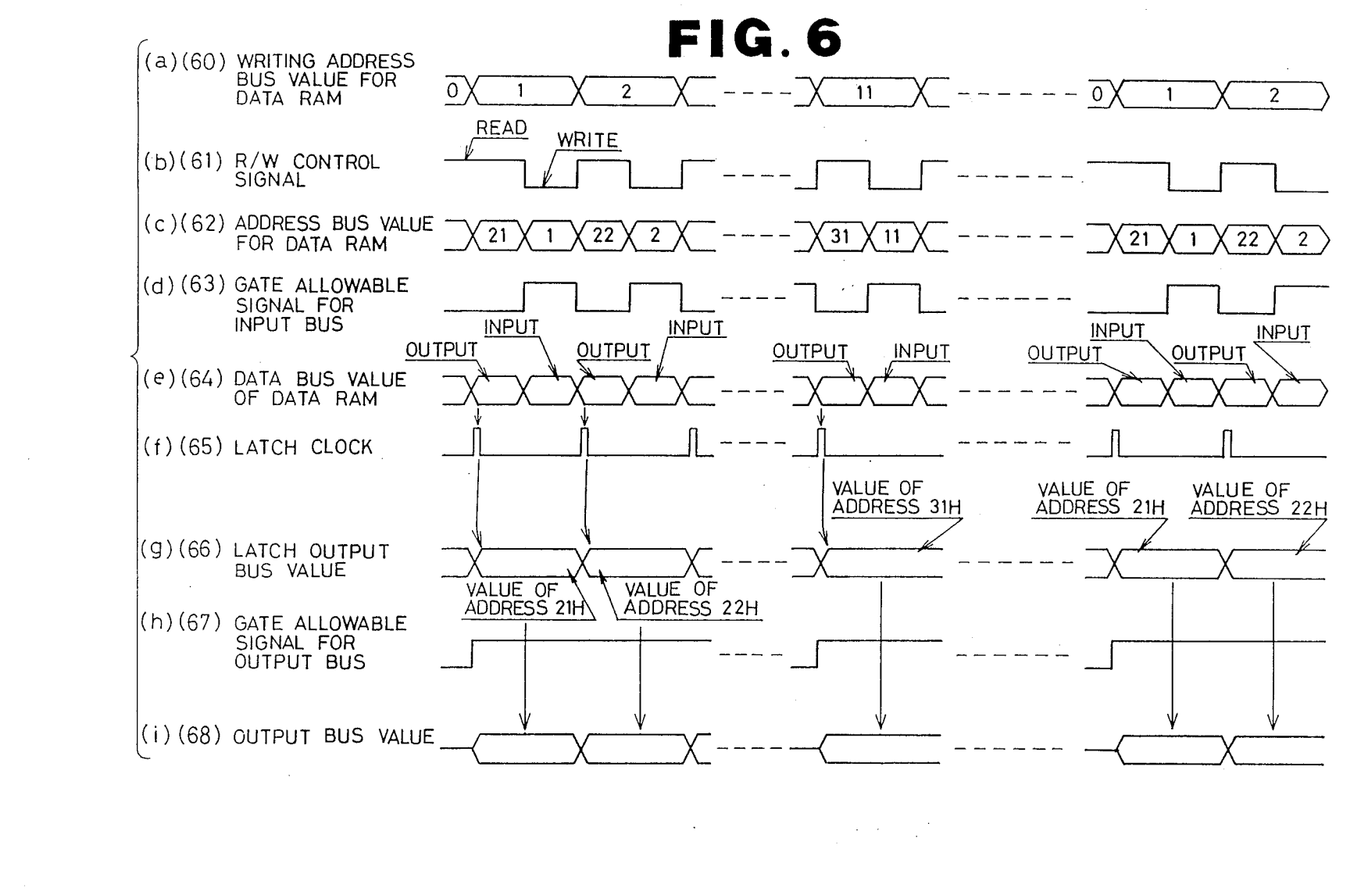

FIGS. 5 and 6 illustrate one preferred embodiment of the present invention. Reference numeral 31 in FIG. 5(a) denotes an input data from the first high-speed circuit 6a. Reference numeral 32 in FIG. 5(b) denotes an input data from the second high-speed circuit 6b. Reference numeral 33 in FIG. 5(c) denotes an input data from a third high-speed circuit 6c. Reference numeral 37 in FIG. 5(d) denotes an output data for the first high-speed circuit 6a. Reference numeral 38 in FIG. 5(e) denotes an output data for the second high-speed circuit 6b. Reference numeral 39 in FIG. 5(f) denotes an output data for the third high-speed circuit 6c.

Reference numeral 60 in FIG. 6(a) denotes a writing address bus value for data RAM: reference numeral 61 in FIG. 6(b) denotes R/W control signal; reference numeral 62 in FIG. 6(c) denotes an address bus value of data RAM; reference numeral 63 in FIG. 6(d) denotes a gate allowable signal for input bus; reference numeral 64 in FIG. 6(e) designates a data bus value for data RAM; reference numeral 65 in FIG. 6(f) denotes a latch clock; reference numeral 66 in FIG. 6(g) designates a latch output bus value; reference numeral 67 in FIG. 6(h) designates a gate allowable signal for an output bus; and reference numeral 68 in FIG. 6(i) denotes an output bus value, respectively.

The address decoder 40, the counter 42, the reading address memory 44, the R/W selector 46, the latch 52, the input bus gate 53 and the output bus gate 57 may constitute a controlling means for writing and reading of the data RAM 50 acting as the memory device.

Next, operation of the above-mentioned arrangement will be described. In FIG. 5, in case that the first high-speed circuit 6a performs a transferring of data by every 10H bits between the second high-speed circuit 6b and the third high-speed circuit 6c, the data transmitted from the first high-speed circuit 6a to the second high-speed circuit 6b and the third high-speed circuit 6c is included in the input data from the first high-speed circuit 6a [FIG. 5(a)]. Further, the timing control circuit 7 may output an address of the second high-speed circuit card 5b in order to fetch the data (indicated by A1 in FIG. 5) for the second high-speed circuit 6b. Still further it may output an address of the third high-speed circuit card 5c in order to take data (indicated by B1 in FIG. 5) for the third high-speed circuit 6c.

The address decoder 40 may fetch a clock of the counter operating in synchronism with 3860 provided by the timing control circuit 7 as the cyclic clock 58. It may output this cyclic clock 58 as the clock 41 for the counter only while the address of any one of the high-speed circuit cards 5a to 5c is selected. This is so that during a time in which data of a total of 20 H bits of data 10 H bits for the second high-speed circuit 6b and data 10 H bits for the third high-speed circuit 6c are inputted, the address decoder 40 may transmit the clock 41 for the counter to the counter 42 by 20 H times Since the counter 42 is reset by the synchronous clock 9, an output value of the counter 42 is varied in compliance with the counter clock 41 from 0 to 20 H.

An output of the counter 42 is sent to the R/W selector 46 as a writing address bus 43 for data RAM and is used as an address when it is written into the data RAM 50.

Although R/W control signal 48 is normally high (read), the R/W selector 46 may output 1 clock of the cyclic clock 58 to the R/W control signal 48 when a value of the writing address bus 43 for data RAM is varied.

With this arrangement, as shown at 61 in FIG. 6(b), the R/W control signal 48 becomes low (write) for ½ clock period. Then, a value of the writing address bus 43 for data RAM is transmitted to the address bus 47 of data RAM.

When a signal, having the R/W control signal 61 reversed, is transmitted as shown in 63 of FIG. 6(d) as the gate allowable signal 56 for the input bus, an allowable state is attained when a writing operation is carried out. The data of the input bus 3 passes through the input bus gate 53 and is written into the data RAM through the data bus 51 for data RAM.

Accordingly, when an output value of the counter 42 is varied up to 20 H, the data sent from the first high-speed circuit 6a to the second high-speed circuit 6b and the third high-speed circuit 6c as shown at A2 and B2 in FIG. 5 is written at addresses of 1 H to 20 H of the data RAM 50.

Similarly, the data sent from the high-speed circuit 6b, to the first high-speed circuit 6a in FIG. 5 is written at addresses 21 H to 30 H as shown at C2 in FIG. 5. Further, the data sent from the third high-speed circuit 6c to the first high-speed circuit 6a is written at addresses 31 H to 40 H of the data RAM 50 as shown at D2 in FIG. 5.

Again, in case that the data is transferred from the first high-speed circuit 6a to the second high-speed circuit 6b and the third high-speed circuit 6c, the counter 42 is reset by the synchronous clock 9. Also and an output value of the counter 42 is varied from 0 H to 20 H in compliance with the counter clock 41.

It is assumed that RAM is used as the reading address memory 44 and further an output of the counter 42 is also inputted to the reading address memory 44. If 21 H to 30 H are written in the addresses 1 H to 10 H and 31 H to 40 H are written in the addresses 11 H to 20 H in the reading address memory 44 in advance, at first 21 H is outputted to the reading bus 45 for data RAM. The addresses are incrementized in sequence in compliance with the counter clock 41 and then their contents of 22 H to 30 H are outputted in sequence As the value of the writing address bus 43 for data RAM is varied, the R/W selector 46 causes the R/W control signal 48 to be alternatively varied as read/write, and as shown at 62 in FIG. 69(c). Since the value of reading address bus 45 for data RAM is transmitted to the address bus 47 for data RAM in case of reading, the content of the address 21 H of the data RAM 50 is outputted at first to the data bus 51 for data RAM.

An initial 1 bit of the data 10 H bits from the previous second high-speed circuit 6b to the first high-speed circuit 6a is written in the address 21H. Then this value is outputted to the data bus 51 for data RAM as shown at 64 in FIG. 6(e).

If it is assumed that the latch clock 49 may output only when the value of writing address bus 43 for data RAM shown in FIG. 6(e) is varied, the value of data bus 51 for data RAM is fetched into the latch 52 by the latch clock 49. Then the value of latch output bus 54 is varied as shown at the latch output bus value 66 of FIG. 6(g).

As shown at 67 in FIG. 6(h), if the gate allowable signal 55 for output bus is allowed while any one of the addresses of the first to third high-speed circuit cards 5a to 5c is being selected, the value of the latch output bus 54 which is the content of the previous address of 21 H is outputted to the output bus 4 through the output bus gate 57.

Similarly, although the contents ranging from 22 H to 30 H are also outputted, these are the data to be applied from the second high-speed circuit 6b to the first high-speed circuit 6a shown at C2 in FIG. 5. Further, the contents of 31 H to 40 H are also outputted. These contents are data fed from the third high-speed circuit 6c to the first high-speed circuit 6a shown at D2 in FIG. 5. Also, and as shown by the output data 37 [FIG. 5(d)] for the first high-speed circuit, both data from the second high-speed circuit 6b (shown at C3 in FIG. 5) and data from the third high-speed circuit 6c (shown at D3 in FIG. 5) are transferred to the first high-speed circuit 6a.

Then, if the second high-speed circuit card 5b is selected, data from the first high-speed circuit 6a to the second high-speed circuit 6b (shown at A2 in FIG. 5) are applied as contents of the addresses 21 H to 30 H of the reading address memory 44. Further 1 H to 10 H are written in advance. Thereby as shown at the output data 38 for the second high-speed circuit 6b [FIG. 5(e)], the data from the first high-speed circuit 6a (shown at A3 in FIG. 5) is transferred to the second high-speed circuit 6b.

Then, if the third high-speed circuit card 5c is selected, similarly, the data from the first high-speed circuit 6a to the third high-speed circuit 6c (shown at B2 in FIG. 5) are applied as the contents of the addresses 31 H to 40 H of the reading address memory 44 and 11 H to 20 H are written. Thereby, as shown at the output data 39 for the third high-speed circuit [FIG. 5(f)], the data from the first high-speed circuit 6a (shown at B3 in FIG. 5) is transferred to the third high-speed circuit 6c.

In FIG. 4, RAM is used as the reading address memory 44. It is more convenient to use ROM due to the fact that a bit assignment of data for the high-speed circuit is fixed. Therefore, even if ROM is used, a similar effect can be attained.

In the above-mentioned example, it has been indicated as if one block of the high-speed data is continuously relayed. However, another block which is not continuous may be processed similarly by dispersing the addresses for the address decoder 40.

As described above, according to the first preferred embodiment of the present invention, even if the number of high-speed circuits are increased, the number of ICs are not varied in the multiplexing apparatus. Therefore, a relay of the high-speed data can be performed.

Figure 7:
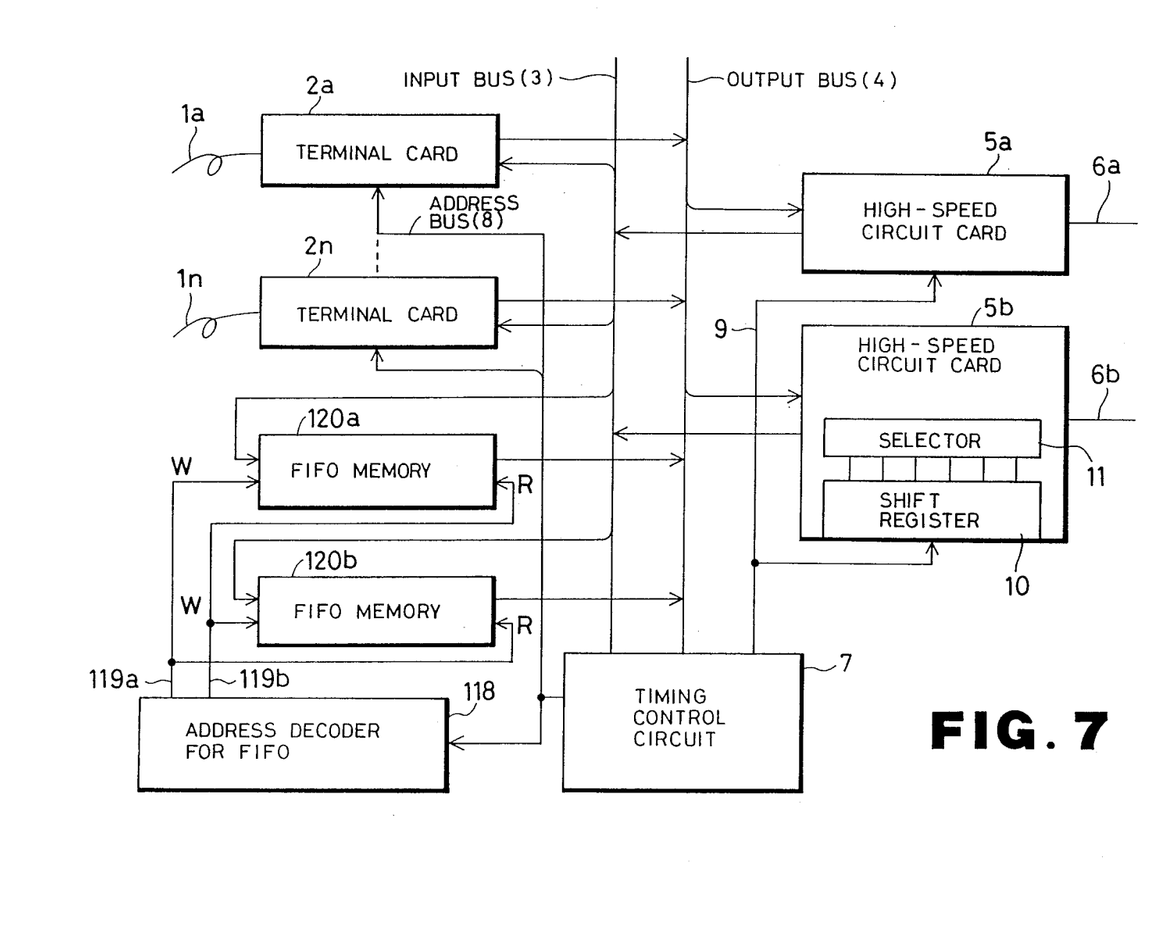
FIG. 7 is a block diagram for showing a configuration of the multiplexing apparatus of the second preferred embodiment of the present invention.

FIG. 7 is a block diagram for showing a second preferred embodiment of the present invention. FIG. 7 shows a case in which two systems of the high-speed circuits 6a and 6b and the high-speed circuit cards 5a and 5b are applied. In such a system the data RAM 50, latch 52, input bus gate 53, output bus gate 57, R/W selector 46, reading address memory 44 and address decoder 40 in FIG. 4 are not used.

Alternatively, FIFO memories 120a and 120b and address decoder 118 for FIFO are used To the address decoder 118 for FIFO is connected an address bus 8. From the address decoder 118 for FIFO are outputted FIFO control signals 119a and 119b FIFO control signals 119a and 119b are connected to the first and second FIFO memories 120a and 120b.

Figure 8:
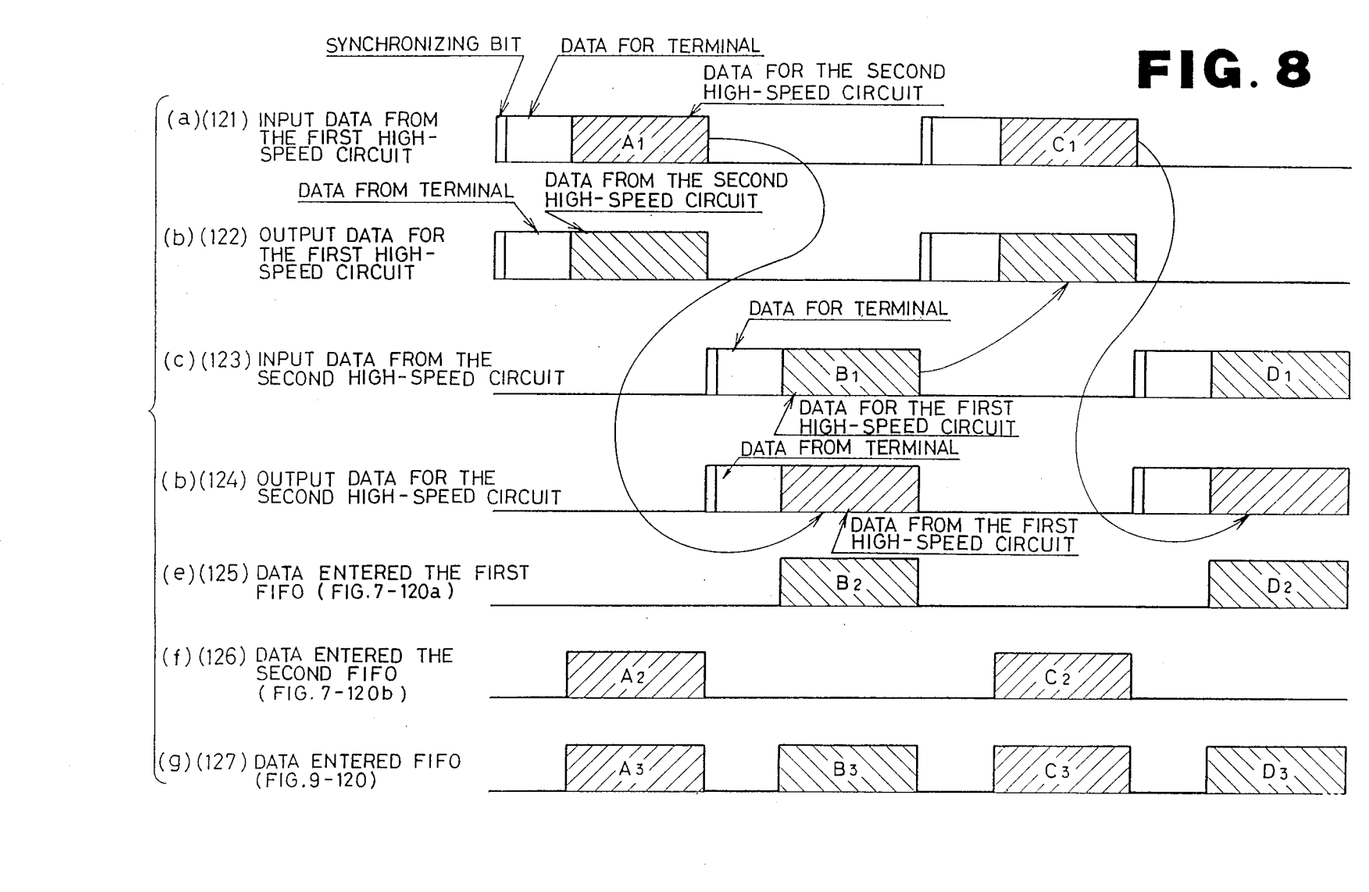
FIG. 8 is an explanatory view for showing operation of the second preferred embodiment of the present invention.

Next, operation of this system will be described. FIG. 8 is an explanatory view for showing operation of the preferred embodiment shown in FIG. 7. Reference numeral 121 in FIG. 8(a) denotes an input data from the first high-speed circuit 6a; reference numeral 122 in FIG. 8(b) designates an output data to the first high-speed circuit 6a; reference numeral 123 in FIG. 8(c) denotes an input data from the second high-speed circuit 6b; reference numeral 124 in FIG. 8(d) denotes an output data for the second high-speed circuit 6b; reference numeral 125 in FIG. 8(e) denotes data fed into the first FIFO memory 120a; and reference numeral 126 in FIG. 8(f) denotes data to be fed into the second FIFO memory 120b.

The timing control circuit 7 has memories to which the addresses of the terminal cards 2a to 2n and the first and second high-speed circuit cards 5a and 5b are corresponded for every counter values of 3860 pieces. Further, the address values outputted from these memories are transmitted to each of the terminal cards 2a to 2n and the address decoder 118 for FIFO through the address bus 8.

Data transmitted from the first high-speed circuit 6a to the second high-speed circuit 6b are included in the input data 121 [FIG. 8(a)] from the first high-speed circuit 6a. Further, the timing control circuit 7 may output an address of the second high-speed circuit card 5b in order to fetch the data (shown at A1 in FIG. 8) into the second high-speed circuit 6b.

Address decoder 118 for FIFO may write data (indicated at A2 in FIG. 8) into the second FIFO memory 120b by turning OFF the control signal 119a and turning ON the control signal 119b as shown at data 126 to be fed to the second FIFO memory 120b.

Then, data to be transmitted from the second high-speed circuit 6b to the first high-speed circuit 6a is included in the input data 123 [FIG. 8(c)] from the second high-speed circuit 6b. Further, the timing control circuit 7 may output an address of the first high-speed circuit card 5a in order to fetch the data (indicated at B1 in FIG. 8) for the first high-speed circuit 6a.

Address decoder 118 for FIFO may write the data (indicated at B2 in FIG. 8) into the first FIFO memory 120a by turning ON the control signal 119a and turning OFF the control signal 119b as shown at data 125 [FIG. 8(e)], to be fed into the first FIFO memory 120a.

At this time, a reading from the second FIFO memory 120b is allowed. The previous data (indicated at A2 in FIG. 8) is sent to the output bus 4. Subsequently, the data from the first high-speed circuit 6a is outputted to the second high-speed circuit 6b as shown at the output data 124 [FIG. 8(d)] for the second high-speed circuit 6b.

Figure 9:
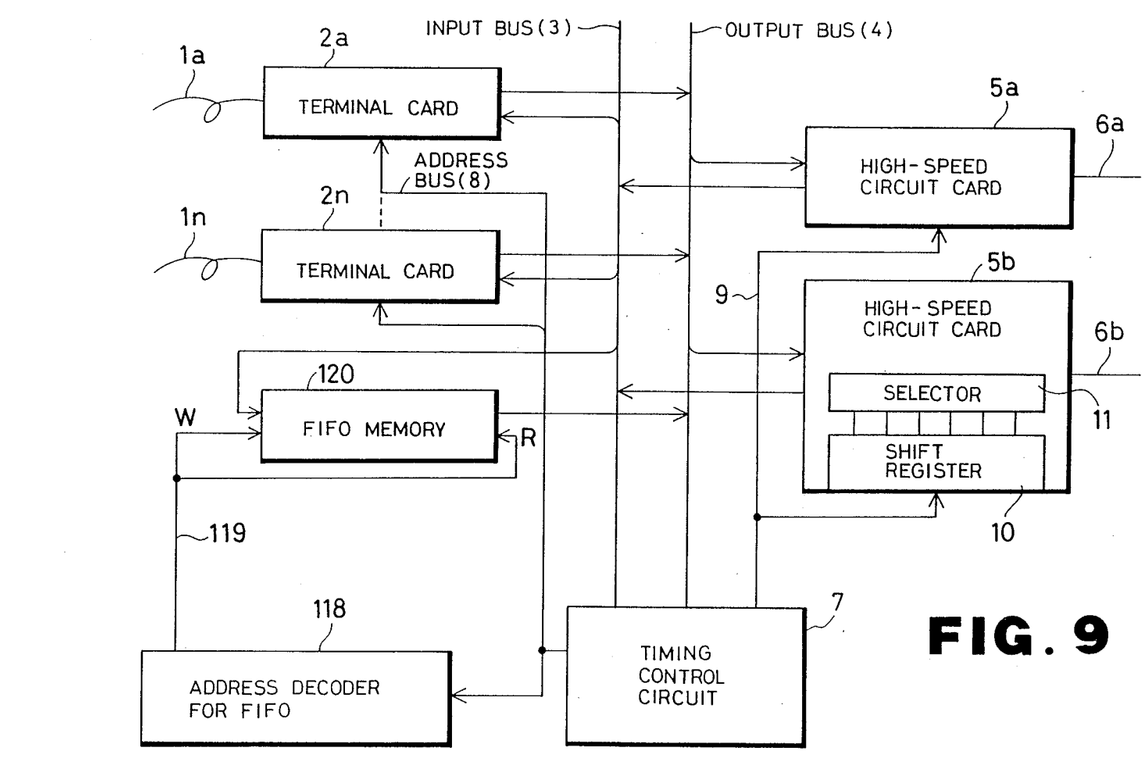
FIG. 9 is a block diagram for showing a configuration of the multiplexing apparatus of the third preferred embodiment of the present invention.

FIG. 9 is a block diagram for showing a third preferred embodiment of the present invention. In FIG. 9, one FIFO memory 120 is used and reference numeral 127 in FIG. 8(g) denotes an input data for this FIFO memory 120. As shown in FIG. 9, even if there is one FIFO memory 120, a relay function can be applied to the multiplexing apparatus.

Data transmitted from the first high-speed circuit 6a to the second high-speed circuit 6b is included in the input data 121 [FIG. 8(a)] from the first high-speed circuit 6a. The timing control circuit 7 may output an address of the second high-speed circuit card 5b in order to fetch data (indicated at A1 in FIG. 8) for the second high-speed circuit 6b. Address decoder 118 for FIFO may write data (indicated at A3 in FIG. 8) into the FIFO memory 120 by turning ON the control signal 119 as shown at data 127 inputted to the FIFO memory 120 [FIG. 8(g)].

Then, data transmitted from the second high-speed circuit 6b to the first high-speed circuit 6a is included in the input data 123 [FIG. 8(c)] from the second high-speed circuit 6b. Further, the timing control circuit 7 may output an address of the first high-speed circuit card 5a in order to fetch data (indicated at B1 in FIG. 8) for the first high-speed circuit Address decoder 118 for FIFO may write data (indicated at B3 in FIG. 8) into FIFO memory 120 by turning ON the control signal 119 as indicated by data 127 [FIG. 8(g)] to be fed into FIFO memory 120.

At this time, a reading from the FIFO memory 120 is also allowed and the previous data (indicated at A3 in FIG. 8) is transmitted to the output bus 4. Further, data from the first high-speed circuit 6a is outputted to the second high-speed circuit 6b as shown at an output data 124 for the second high-speed circuit 6b.

In FIG. 7, the FIFO memories 120a and 120b become memory devices and the FIFO address decoder 118 may become a writing and reading control devices for the memory devices. In FIG. 9, FIFO a memory 120 becomes memory devices and address decoder 118 for FIFO becomes its writing and reading means.

Although the examples shown in FIGS. 7 and 9 indicate a system in which one block of high-speed data is continuously relayed However, data which is not continuous can be processed similarly by dispersing the address for FIFO memory.

As described above, according to the preferred embodiment shown in FIGS. 7 and 9, application of FIFO memory and address decoder for FIFO enables data to be transmitted from one high-speed circuit to the other high-speed circuit.

Figure 10:
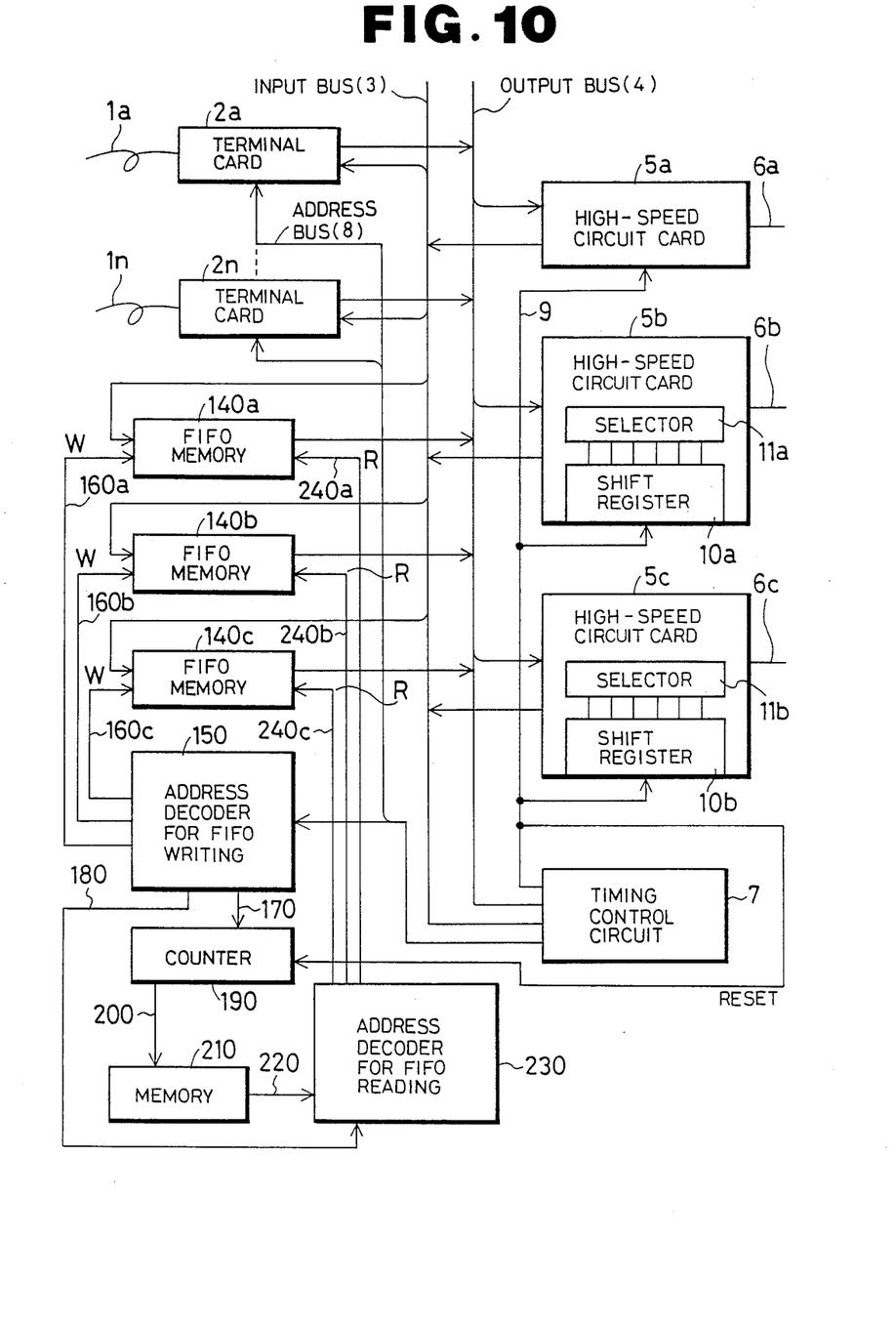
FIG. 10 is a block diagram for showing a configuration of the multiplexing apparatus of the fourth preferred embodiment of the present invention.

FIG. 10 is a block diagram for showing a fourth preferred embodiment of the present invention, wherein reference numeral 150 denotes an address decoder for FIFO writing to which an address bus 8 from the timing control circuit 7 is connected. Subsequently, FIFO writing control signals 160a to 160c are outputted.

FIFO writing control signals 160a to 160c are connected to the FIFO memories 140a to 140c. From the FIFO writing address decoder 150 are also outputted counter clock 170 and FIFO allowable signal 180 The counter clock 170 is connected to the counter 190 and a synchronizing clock 9 from the timing control circuit 7 is also connected to the counter 190.

From the counter 190 is outputted a counted value and this is connected to the memory 210 as a memory address bus 200.

Reference numeral 220 denotes FIFO reading address bus connected between the memory 210 and the FIFO reading address decoder 230. To the FIFO reading address decoder 230 is also inputted the FIFO allowable signal 180.

Each of the FIFO reading control signals 240a to 240c is transmitted from the FIFO reading address decoder 230 to each of the FIFO memories 140a to 140c.

In FIG. 10, FIFO memories 140a to 140c may constitute a memory device, and FIFO writing address decoder 150, counter 190, memory 210 and FIFO reading address decoder 230 may constitute a control device.

In addition, reference numerals 1a to 1n, 2a to 2n 3, 4, 5a to 5c, 6a to 6c and 7 to 9 are similar to that of the preferred embodiment shown in FIG. 4.

Figure 11:
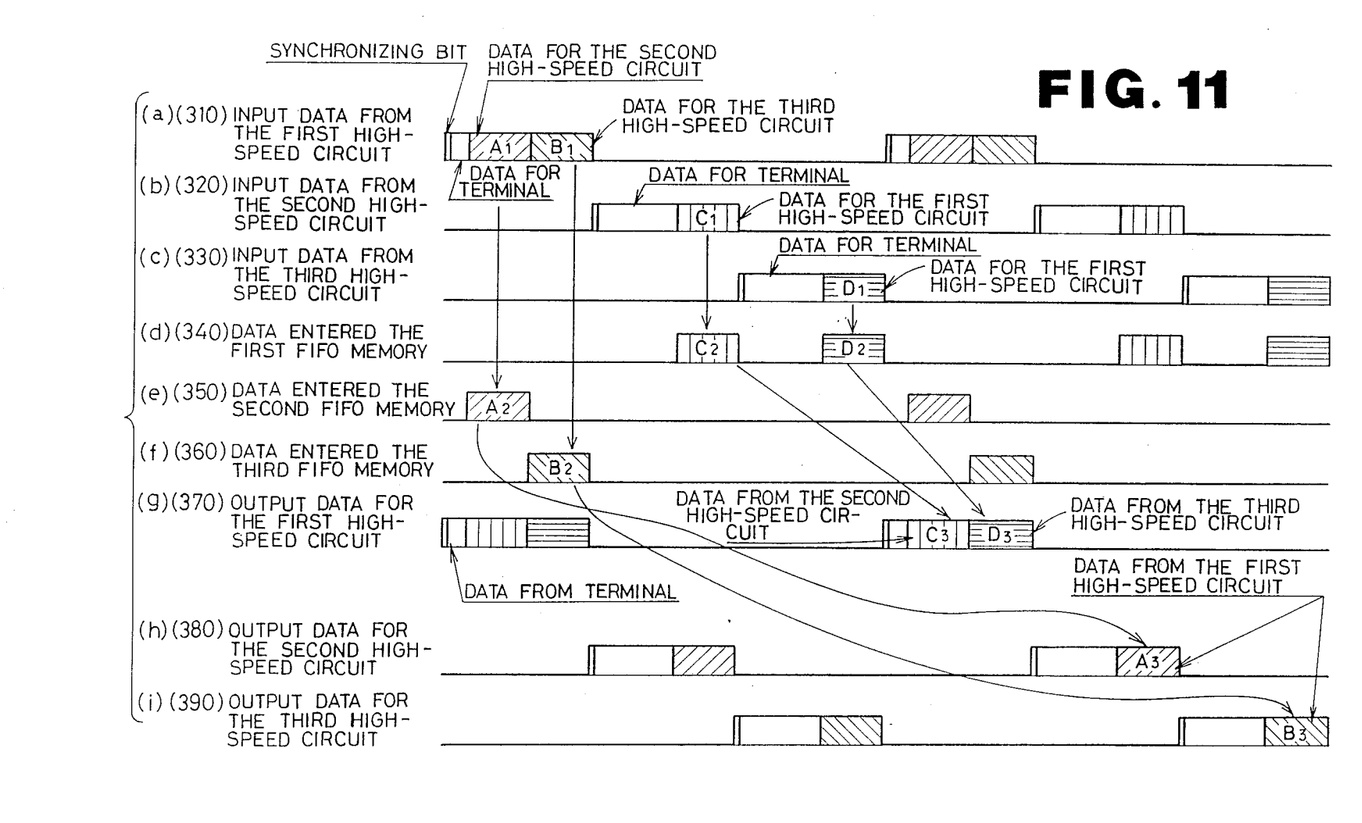
FIG. 11 is an explanatory view for showing operation of the multiplexing apparatus of FIG. 10.

FIG. 11 is an operative illustration for showing the preferred embodiment of FIG. 10. Reference numeral 310 in FIG. 11(a) denotes input data from the first high-speed circuit 6a; reference numeral 320 in FIG. 11(b) denotes an input data from the second high-speed circuit 6b; and reference numeral 330 in FIG. 11(c) denotes an input data from the third high-speed circuit 6c. Reference numeral 340 in FIG. 11(d) denotes data to be fed into the first FIFO memory 140a; reference numeral 350 in FIG. 11(e) denotes data to be fed into the second FIFO memory 140b; reference numeral 360 in FIG. 11(f) denotes data to be fed into the third FIFO memory 140c; and reference numeral 370 in FIG. 11(g) denotes an output data for the first high-speed circuit 6a. Reference numeral 380 in FIG. 11(h) denotes an output data for the second high-speed circuit 6b and reference numeral 390 in FIG. 11(i) denotes an output data for the third high-speed circuit 6c.

Next, operation of this system will be described. In case that the first high-speed circuit 6a may perform a data transferring operation between the second high-speed circuit 6b and the third high-speed circuit 6c. Data to be transmitted from the first high-speed circuit 6a to the second high-speed circuit 6b and the third high-speed circuit 6c is included in the input data 310 [FIG. 11(a)] from the first high-speed circuit 6a. The timing control circuit 7 may output an address of the second high-speed circuit card 5b in order to fetch data (indicated at A1 in FIG. 11) for the second high-speed circuit 6b.

Address decoder 150 for FIFO writing may write data (indicated at A2 in FIG. 11) into the second FIFO 140b by turning ON the second FIFO writing control signal 160b and turning OFF other FIFO writing control signals 160a and 160c as indicated in data 350 [FIG. 11(e)] to be fed to the second FIFO memory 140b.

Similarly, the timing control circuit 7 may output the address of the third high-speed circuit card 5c in order to fetch the data (indicated at B1 in FIG. 11) for the third high-speed circuit 6c.

FIFO writing address decoder 150 may write data (indicated at B2 in FIG. 11) into the third FIFO memory 140c by turning ON the third FIFO writing control signal 160c and turning OFF other FIFO writing control signals 160a and 160b as indicated by data 360 [FIG. 11(f)] to be fed into the third FIFO memory 140c.

Data to be transmitted from the second high-speed circuit 6b to the first high-speed circuit 6a is included in the input data 320 [FIG. 11(b)] from the second high-speed circuit 6b. The timing control circuit 7 may output an address of the first high-speed circuit card 5a in order to fetch data (indicated at C1 in FIG. 11) to the first high-speed circuit.

FIFO writing address decoder 150 may write data (indicated at C2 in FIG. 11) into the first FIFO memory 140a by turning ON the first FIFO writing control signal 160a and turning OFF other FIFO writing control signals 160b and 160c as indicated in data 340 [FIG. 11(d)] to be fed to the first FIFO memory 140a.

Data to be transmitted from the third high-speed circuit 6c to the first high-speed circuit 6a is included in the input data from the third high-speed circuit 6c [FIG. 11(c)]. The timing control circuit 7 may output an address of the first high-speed circuit card 5a in order to fetch data (indicated at D1 in FIG. 11) for the first high-speed circuit 6a.

FIFO writing address decoder 150 may write data (indicated at D2 in FIG. 11) into the first FIFO memory 140a by turning ON the first FIFO writing control signal 160a and turning OFF other FIFO writing control signals 160b and 160c as indicated by data 340 [FIG. 11(d)] to be fed to the first FIFO memory 140a.

In case that data is transmitted again from the first high-speed circuit 6a to the second high-speed circuit 6b and the third high-speed circuit 6c, the counter 190 is reset in compliance with the synchronizing clock 9.

FIFO writing address decoder 150 may send the counter clock 170 every time any one of the first to third high-speed circuit cards 5a to 5c is selected.

At first, the second high-speed circuit card 5b is selected, then the third high-speed circuit card 5c is selected. Thus, the clock is sent by two times. Accordingly, the counted value is increased, a value of the memory address bus 200 is varied from "0" to "1" and then from "1" to "2". RAM is used in the memory 210, an address of the first high-speed circuit card 5a is written to the memory address value "1" in the memory 210 in advance and an address of the first high-speed circuit card 5a is also written to the memory address value "2" in advance. This value is outputted to the FIFO reading address bus 220.

FIFO writing address decoder 150 is operated such that if FIFO allowable signal 180 is allowed only when any one of the writing control signals 160a to 160c for the FIFO memory is turned ON, the FIFO reading address decoder 230 may interpret this value when the address of the first high-speed circuit card 5a is outputted to the previous FIFO reading address bus 220 Since the FIFO allowable signal 180 is allowed, the first FIFO reading control signal 240a is turned ON and other FIFO reading control signals 240b and 240c are turned OFF.

With this arrangement, the previous data (indicated at C2 and D2 in FIG. 11) is transmitted to the output bus 4 and both data from the second high-speed circuit 6b (indicated at C3 in FIG. 11) and the data (indicated at D3 in FIG. 11) from the third high-speed circuit 6c are transmitted to the first high-speed circuit card 6a as shown by output data 370 [FIG. 11(g)] for the first high-speed circuit 6a.

Then, if the second high-speed circuit card 5b is selected, similarly, the clock is sent by one time; so thus, the counted value is increased by one and the value of the memory address bus 200 is varied from 2 to 3. If the address of the second high-speed circuit card 5b is written into the memory address value 3 in the memory 210 in advance, this value is outputted to the FIFO reading address bus 220 and FIFO allowable signal 180 is also allowed. Thus, the FIFO reading address decoder 230 may interpret this value to turn ON the second FIFO reading control signal 240b and to turn OFF other FIFO reading control signals 240a and 240c.

With this arrangement, the previous data (indicated at A2 in FIG. 11) is sent to the output bus 4 and the data from the first high-speed circuit 6a (indicated at A3 in FIG. 11) is transmitted to the second high-speed circuit 6b as indicated by the output data 380 for the second high-speed circuit 6b [FIG. 11(h)].

Then, if the third high-speed circuit card 5c is selected, similarly, a clock is sent once. Therefore, the counted value is increased by one and a value of the memory address bus 200 is varied from "3" to "4".

If an address of the third high-speed circuit card 5c is written into the memory address value 4 in the memory 210 in advance, this value is outputted to the FIFO reading address bus 220 and the FIFO allowable signal 180 is also allowed. Therefore the FIFO reading address decoder 230 may interpret this value to turn ON the third FIFO reading control signal 240c and to turn OFF other FIFO reading control signals 240a and 240b.

With this arrangement, the previous data (indicated at B2 in FIG. 11) is transmitted to the output bus 4, and the data (indicated at B3 in FIG. 11) from the first high-speed circuit 6a is transmitted to the third high-speed circuit 6c as indicated at the output data 390 for the third high-speed circuit 6c [FIG. 11(i)].

In FIG. 10, RAM is used as the memory 210 In case that a bit assignment of data for the high-speed circuit is fixed, an application of ROM is more convenient and a similar effect may also be attained even if ROM is used.

The example shown in FIG. 10 illustrates a case in which three high-speed circuits are applied. Even if the number of high-speed circuits are increased, a similar effect can be attained by using the FIFO memories of which numbers correspond to the number of high-speed circuits.

In this way, even if the number of the high-speed circuits are more than three, a relay of the high-speed data can be carried out with the multiplexing apparatus.

As described above, according to the present invention, data to be relayed from the prescribed high-speed circuit of plural high-speed circuits to another high-speed circuit is stored. A writing of data of the other high-speed circuit card is allowed for the memory device by a controlling device when this prescribed high-speed circuit card is being used. In when this another high-speed circuit card is being used, data in the desired high-speed circuit card is allowed for the memory device by the controlling device so as to make a high-speed relaying of data of plural high-speed data. This results in that even if the number of high-speed circuits are increased, the present invention may have an effect that the number of ICs in the multiplexing apparatus are not varied and a relay of high-speed data can be carried out.

What is claimed is:

1. An apparatus for multiplexing a plurality of high and low speed circuits on a time share basis to allow for data transfer between the plural high and low speed circuits, the apparatus comprising:
   plural terminal cards for transmitting and receiving data at low speed, each connected to one of said plural low speed circuits, respectively;
   plural high-speed circuit cards, for transmitting and receiving data at high speed, each connected to one of said plural high speed circuits, respectively;
   memory means, operatively connected to each of said plural high-speed circuit cards, for storing data transmitted from at least one of said plural high-speed circuit cards to be subsequently output to a different of at least one of said plural high-speed circuit cards;
   timing control means, operatively connected to each of said plural terminal cards and each of said plural high-speed circuit cards, for converting the low speed of the data of said plural terminal cards, corresponding to addresses of said plural terminal cards, to addresses of said plural high-speed circuit cards and for controlling transmission of the speed converted data to said plural high-speed circuit cards to thereby provide multiplexing and timing control; and control means, operatively connected to said timing control means and said memory means, for inputting first and second control signals in conjunction with said timing control means, to control transmission of data to said memory means and outputting of data from said memory means, respectively, to thereby allow for data transfer between said plural high-speed circuits.

2. The multiplexing apparatus wherein said memory means is a RAM (Random Access Memory).

3. The multiplexing apparatus wherein said memory means is a FIFO (First-In First-Out) memory and said control means is a FIFO address decoder.

4. The apparatus of claim 1, wherein said timing control means further comprises:
   timing memory means for storing addresses, one corresponding to each of said plural high-speed cards; and
   output selection means, operatively connected to said timing memory means, for sequentially outputting addresses from said timing memory means, to sequentially select each of said plural high-speed circuit cards.

5. The apparatus of claim 4, wherein said control means comprises:
   address decoder means, operatively connected to said timing control means, for receiving said output addresses and decoding which of said plural high-speed circuit cards has been selected;
   sequential address location means, operatively connected to said address decoder means, for sequentially outputting memory address locations corresponding to said selected plural high-speed circuit card;
   read and write selection means, operatively connected to said sequential address location means, for alternately inputting said first and second control signals to said memory means to control inputting of data to said sequentially output memory address locations of said memory means and outputting of data from said sequentially output memory address locations of said memory means, respectively.

6. The apparatus of claim 5, wherein said control means further comprises:
   address converting memory means, operatively connected to said sequential address location means and said read and write selection means, for sequentially receiving said output memory address locations from said sequential address location means and for sequentially outputting memory address locations, different from said output memory address locations but corresponding to said output memory address locations, to said read and write selection means.

7. The apparatus of claim 6, wherein said different memory address locations corresponding to said output memory address locations are preprogrammed into said address converting memory means.

8. The apparatus of claim 7, wherein said address converting memory means is a RAM.

9. The apparatus of claim 7, wherein said address converting memory means is a ROM.

10. The apparatus of claim 1, wherein said memory means is operatively connected to each of said plural high-speed circuit cards by means of an input bus to allow data to be transferred from at least one of said plural high-speed circuit cards into said memory means, and by means of an output bus to allow data to be transferred to at least one of said plural high-speed circuit cards from said memory means.

11. The apparatus of claim 1, further comprising:
latch means, operatively connecting said memory means to said output bus, for storing data output from said memory means and for outputting said data to said output bus.

12. An apparatus for multiplexing a plurality of high and low speed circuits on a time-share basis to allow for data transfer between the plural high and low speed circuits, the apparatus comprising:
plural terminal cards, for transmitting and receiving data at low speed, each connected to one of said plural low speed circuits, respectively;
plural high-speed circuit cards, for transmitting and receiving data at a high speed, each connected to one of said high speed circuits, respectively;
FIFO memory means, operatively connected to each of said plural high-speed circuit cards, for storing data transmitted from at least one of said plural high-speed circuit cards to be subsequently output to a different of at least one of said plural high-speed circuit cards in a first-in first-out (FIFO) manner;
timing control means, operatively connected to each of said plural terminal cards and plural high-speed circuit cards, for storing and subsequently outputting addresses corresponding to each of said plural terminal cards and plural high-speed circuit cards to control data transmission of said plural terminal cards and said plural high speed circuit cards; and
memory control means, operatively connected to said timing control means and said FIFO memory means, for detecting said output address from said timing control means, for controlling outputting of stored data from said FIFO memory means to said high speed circuit cards corresponding to said detected output address, and for controlling inputting of data to said FIFO memory means for subsequent storage, from a different one of said high-speed circuit cards which does not correspond to said detected address.

13. The apparatus of claim 12, wherein said FIFO memory means comprises a first FIFO memory and a second FIFO memory.

14. The apparatus of claim 13, wherein said memory control means outputs a first control signal to one of said first and second FIFO memories to control outputting of stored data from said one FIFO memory, and said memory control means simultaneously outputs a second control signal to the other one of said first and second FIFO memories to control inputting of data to said other FIFO memory, said first and second control signals being alternately output to said first and second FIFO memories in an alternating, sequential manner.

15. The apparatus of claim 12, wherein said FIFO memory means comprises:
plural FIFO memories corresponding in number to said plural high-speed circuit cards.

16. The apparatus of claim 15, wherein said memory control means sequentially outputs a control signal to one of each of said plural FIFO memories to control inputting of data for subsequent storage to each one of said plural FIFO memories and simultaneously sequentially outputs a control signal to each of the other of said plural FIFO memories which are not receiving said first control signal, to prevent inputting and subsequent storage of data.

17. The apparatus of claim 16, wherein said memory control means comprises:
address decoder reading means and for detecting said output address from said timing control means and for controlling outputting of stored data from a selected one of said plural FIFO memories, corresponding to said detected output address, to said high speed circuit card corresponding to said detected output address; and
address decoder writing means for sequentially outputting a control signal to one of each of said plural FIFO memories to control inputting of data for subsequent storage to each one of said plural FIFO memories and simultaneously outputting a control signal to each of the other of said plural FIFO memories which are not receiving said first control signal, to prevent inputting and subsequent storage of data.

* * * * *